(12) United States Patent
Barrick et al.

(10) Patent No.: US 10,678,547 B2
(45) Date of Patent: *Jun. 9, 2020

(54) LOW LATENCY EXECUTION OF FLOATING-POINT RECORD FORM INSTRUCTIONS

(71) Applicant: INTERNATIONAL BUSINESS MACHINES CORPORATION, Armonk, NY (US)

(72) Inventors: Brian J. D. Barrick, Pflugerville, TX (US); Maarten J. Boersma, Holzgerlingen (DE); Niels Fricke, Herrenberg (DE); Michael J. Genden, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/796,135

(22) Filed: Oct. 27, 2017

(65) Prior Publication Data

US 2019/0018685 A1    Jan. 17, 2019

Related U.S. Application Data

(63) Continuation of application No. 15/648,228, filed on Jul. 12, 2017.

(51) Int. Cl.
*G06F 9/30* (2018.01)
*G06F 9/38* (2018.01)

(52) U.S. Cl.
CPC ........ *G06F 9/30196* (2013.01); *G06F 9/3001* (2013.01); *G06F 9/3017* (2013.01); *G06F 9/3851* (2013.01)

(58) Field of Classification Search
None
See application file for complete search history.

(56) References Cited

U.S. PATENT DOCUMENTS

| 5,958,046 A * | 9/1999 | Bondi ..................... G06F 9/322 712/230 |
| 6,871,273 B1 * | 3/2005 | Moore ................ G06F 9/30043 712/207 |
| 9,424,039 B2 | 8/2016 | Plotnikov |
| 9,886,277 B2 | 2/2018 | Loktyukhin et al. |
| 9,898,291 B2 | 2/2018 | Henry et al. |
| 2009/0198967 A1 * | 8/2009 | Blaner ................ G06F 9/30043 712/216 |
| 2009/0254735 A1 * | 10/2009 | Coll ..................... G06F 9/30014 712/208 |

(Continued)

OTHER PUBLICATIONS

List of IBM Patents or Patent Applications Treated as Related dated Oct. 27, 2017, 2 pages.

*Primary Examiner* — Eric Coleman
(74) *Attorney, Agent, or Firm* — Tutunjian & Bitetto, P.C.; Bryan Bortnick

(57) ABSTRACT

A computer processing system is provided. The computer processing system includes a processor configured to crack a record form FP instruction into two internal instructions. A first one of the two internal instructions executes out-of-order to compute a target FP register and a second one of the two internal instructions executes in-order to compute a condition register (CR) to improve a processing speed of the record form FP instruction.

7 Claims, 5 Drawing Sheets

(56) References Cited

U.S. PATENT DOCUMENTS

| | | | |
|---|---|---|---|
| 2009/0259830 A1* | 10/2009 | Indukuru | G06F 9/3802 |
| | | | 712/227 |
| 2011/0219213 A1* | 9/2011 | Busaba | G06F 9/30174 |
| | | | 712/208 |
| 2011/0252220 A1* | 10/2011 | Busaba | G06F 9/30032 |
| | | | 712/204 |
| 2011/0276764 A1* | 11/2011 | Alexander | G06F 9/30032 |
| | | | 711/125 |
| 2014/0281405 A1* | 9/2014 | Streett | G06F 9/30098 |
| | | | 712/216 |
| 2016/0313997 A1* | 10/2016 | Gschwind | G06F 9/3017 |

* cited by examiner

LOW LATENCY EXECUTION OF FLOATING-POINT RECORD FORM INSTRUCTIONS

BACKGROUND

Technical Field

The present invention relates generally to information processing and, in particular, to low latency execution of floating-point record form instructions.

Description of the Related Art

Floating-point Record Form instructions are slow compared to regular Floating-point Instructions, because in addition to regular computation, exception bits from all previous instructions must be recorded in a condition register.

In today's processors (including, for example, but not limited to any of the POWER6/POWER7®/POWER8® processors), record form Floating-point (FP) instructions are not issued until all older instructions have completed. The drawback of that approach is the late availability of the result register, likely holding off the execution of subsequent dependent instructions.

Moreover, it is to be noted that there are contradicting requirements for record form FP instructions. For example, for optimum performance, the result FRT is needed as soon as possible, and is thus obtained by using out-of-order execution. In contrast, for the correct Condition Register (CR), all older instructions should be waited for and are thus often executed in-order.

To the preceding end, we note that the following processors have in-order execution capability: POWER6; POWER7®; and POWER8®. These processors have a wait capability that can be applied to the execution of an instruction such that the instruction is not executed until all younger instructions have completed. Accordingly, the result is available late, leading to record form instruction processing being slow in such processors.

As another approach for processing record form instructions, a compiler could avoid having to process record form instructions and instead use a special instruction (merfs) in their place. However, such an approach is not without deficiencies. For example, such an approach can unnecessarily hold off execution of younger operations. Also, only programs that can be recompiled will benefit, whereas existing code will still be slow.

Hence, there is a need for a solution for executing record form FP instructions that allows fast execution while still maintaining correct CR result.

SUMMARY

According to an aspect of the present invention, a computer processing system is provided. The computer processing system includes a processor configured to crack a record form FP instruction into two internal instructions. A first one of the two internal instructions executes out-of-order to compute a target FP register and a second one of the two internal instructions executes in-order to compute a condition register (CR) to improve a processing speed of the record form FP instruction.

According to another aspect of the present invention, a computer-implemented method is provided for record form Floating-Point (FP) instruction execution. The method includes cracking, by a processor, a record form FP instruction into two internal instructions. A first one of the two internal instructions executes out-of-order to compute a target FP register and a second one of the two internal instructions executes in-order to compute a condition register (CR) to improve a processing speed of the record form FP instruction.

According to yet another aspect of the present invention, a computer program product is provided for record form Floating-Point (FP) instruction execution. The computer program product includes a computer readable storage medium having program instructions embodied therewith. The program instructions are executable by a computer to cause the computer to perform a method. The method includes cracking, by a processor, a record form FP instruction into two internal instructions, wherein a first one of the two internal instructions executes out-of-order to compute a target FP register and a second one of the two internal instructions executes in-order to compute a condition register (CR) to improve a processing speed of the record form FP instruction.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to low latency execution of floating-point record form instructions. The present invention can be used in processors including, but not limited to, for example, the POWER 6, the POWER7®, and the POWER8® microprocessors by IBM®. That is, the preceding processors to which the present invention can be applied are merely illustrative, as the teachings of the present invention are readily applied to other processors given the teachings of the present invention provided herein, while maintaining the spirit of the present invention.

In an embodiment, the present invention cracks record form floating-point instruction into two internal instructions, where one of the two internal instructions computes the FRT and executes out-of-order and the other one of the two internal instructions computes the CR and executes in-order.

In an embodiment, the record form FP instruction is cracked into the two internal instructions independent of a machine state.

Figure 1:
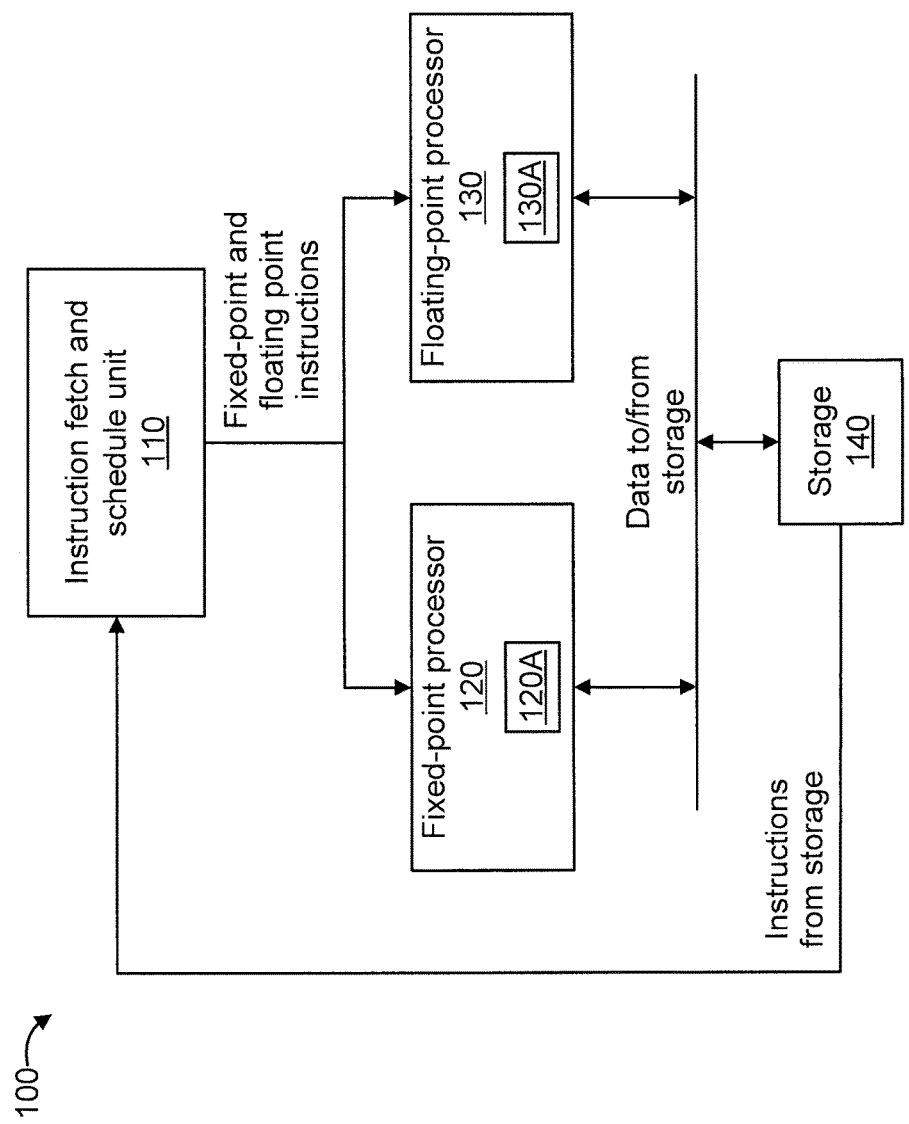
FIG. 1 shows an exemplary processor to which the present invention can be applied, in accordance with an embodiment of the present invention.

FIG. 1 shows an exemplary processor 100 to which the present invention can be applied, in accordance with an embodiment of the present invention.

The processor 100 include instruction fetch and schedule unit 110, a fixed-point processor 120, a floating-point processor 130, and a storage element 140. The fixed-point processor 120 includes a set of registers 120A. The floating-point processor 130 includes a set of registers 130A. The particular registers included in the fixed-point and floating-point processors 120 and 130, respectively, will depend on the particular processor used as readily appreciated by one of ordinary skill in the art.

The processor 100 can process, for example, branch instructions, fixed-point instructions, and floating-point instructions. From a logical perspective, processing begins at the tip with fetching, then scheduling instructions to either fixed-point or floating-point processing. These processes send and receive data from the storage element 140. The storage element 140 will send more instructions to the instruction fetch and schedule unit 110.

In an embodiment, processor 100 is a multi-core processor configured to perform simultaneous multithreading. In an embodiment, processor 100 is a multi-core superscalar symmetric processor.

Processor 100 is shown and described for the sake of illustration. However, it is to be appreciated other processor and processor configurations can also be used in accordance with the teachings of the present invention, while maintaining the spirit of the present invention.

It is to be appreciated that the POWER Floating-point Architecture provides "regular'" instructions, which perform a computation but do not update a Condition Register.

Figure 2:
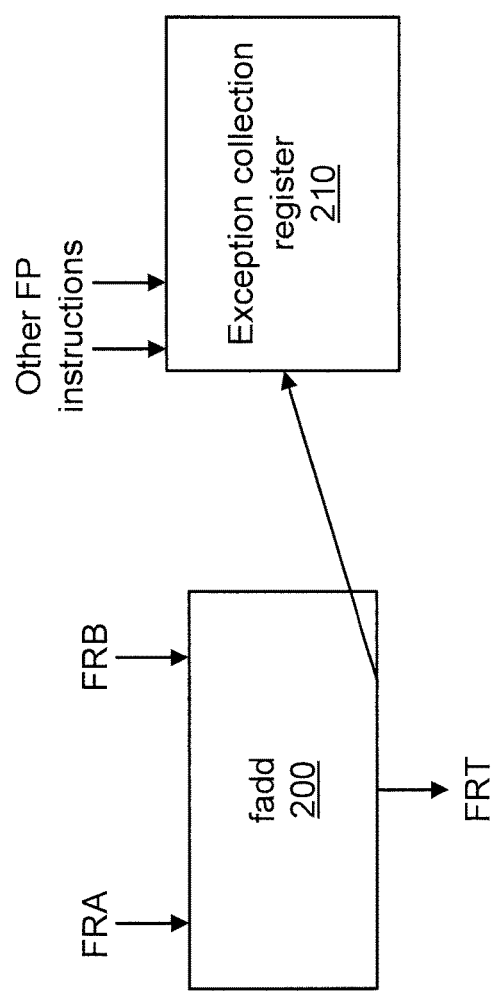
FIG. 2 shows an exemplary "regular" arithmetic instruction for a POWER Floating-point Architecture to which the present invention can be applied, in accordance with an embodiment of the present invention.

FIG. 2 shows an exemplary "regular" instruction 200 for a POWER Floating-point Architecture to which the present invention can be applied, in accordance with an embodiment of the present invention. The instruction 200 is a floating add (fadd) instruction, and involves registers FRA, FRB, and FRT. In particular, FRA specifies the source floating-point register for the add operation, FRB specifies the source floating-point register for the add operation, and FRT specifies the target floating-point register for the add operation.

For example, consider the following sequence: fadd FRT, FRA, FRB. The result FRT=FRA+FRB, and involves implicit exception collection (e.g., overflow) using, for example, an exception collection register 210 (that also processes exceptions for other FP instructions). A critical code path involves waiting for the FRT to continue computation. In modern microprocessors, arithmetic units execute Out-of-Order in order to achieve the best performance.

Moreover, it is to be appreciated that arithmetic instructions are also offered in record form (indicated by a dot).

Figure 3:
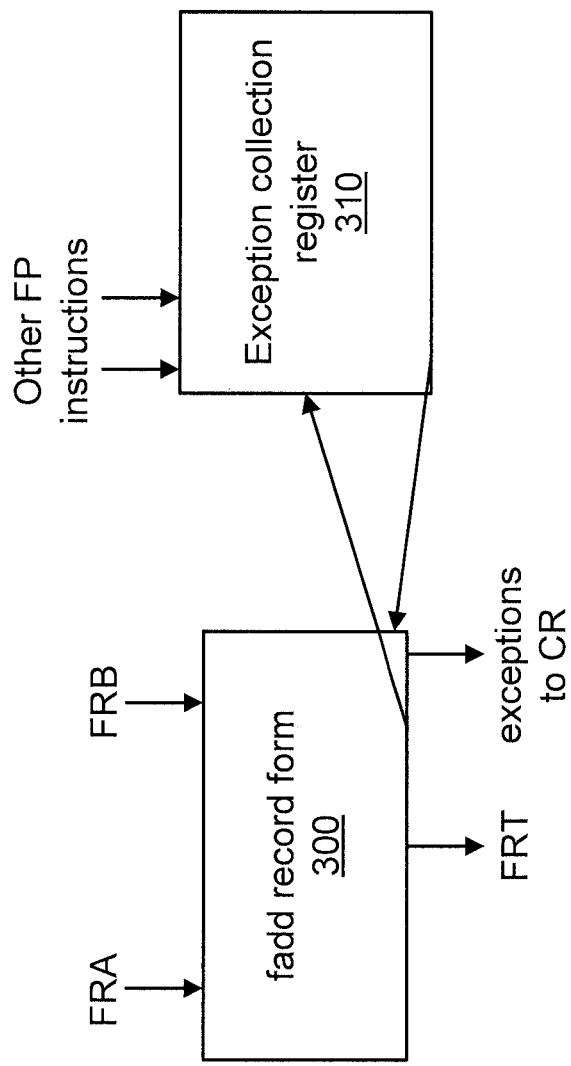
FIG. 3 shows an exemplary "Record-form" arithmetic instruction for a POWER Floating-point Architecture to which the present invention can be applied, in accordance with an embodiment of the present invention.

FIG. 3 shows an exemplary arithmetic instruction 300 for a POWER Floating-point Architecture to which the present invention can be applied, in accordance with an embodiment of the present invention.

For example, consider the following sequence involving a record-form arithmetic instruction (indicated by the dot): fadd.FRT,FRA,FRB. The result FRT=FRA+FRB, and involves implicit exception collection using, for example, an exception collection register 310 (that also processes exceptions for other FP instructions). A critical code path involves waiting for FRT to continue computation. Also, the accumulated FP exceptions are copied into a condition register (CR). The CR is typically used to branch to an exception handler. This branch can be predicted with high confidence, because exceptions are rare.

Reading the exception register is a strict in-order operation. For example, such reading should include the status of all older FP instructions, therefore all older FP instructions should execute first. Also, such reading may not include and/or otherwise involve the status of younger FP instructions.

Modern processors often include a mechanism to break down complicated instructions in a pair (series) of simpler internal instructions. This technique of breaking down instructions is referred to as "cracking". In an embodiment of the present invention, a record form FP instruction is cracked in order to improve result latency.

Figure 4:
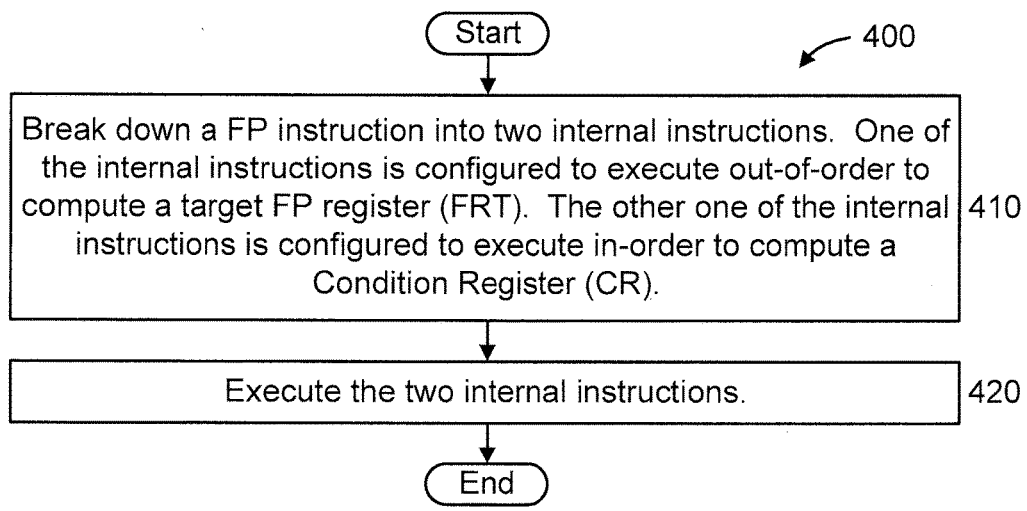
FIG. 4 shows an exemplary method for Floating-Point instruction cracking, in accordance with an embodiment of the present invention.

FIG. 4 shows an exemplary method 400 for Floating-Point instruction cracking, in accordance with an embodiment of the present invention.

At step 410, break down a FP instruction into two internal instructions. One of the internal instructions is configured to execute out-of-order to compute a target FP register (FRT). The other one of the internal instructions is configured to execute in-order to compute a Condition Register (CR).

At step 420, execute the two internal instructions.

It is to be appreciated that the present invention performs critical work as soon as possible, while essentially imposing some wait period for less critical work. In this way, result latency of a record form FP instruction is improved. It is to be further appreciated that the respective executions of the first internal instruction and the second internal instruction reduce the critical code path of a record form FP instruction and/or of a program that includes a record form FP instruction. The instruction processed in FIG. 3 can be broken down as shown in FIG. 4.

Figure 5:
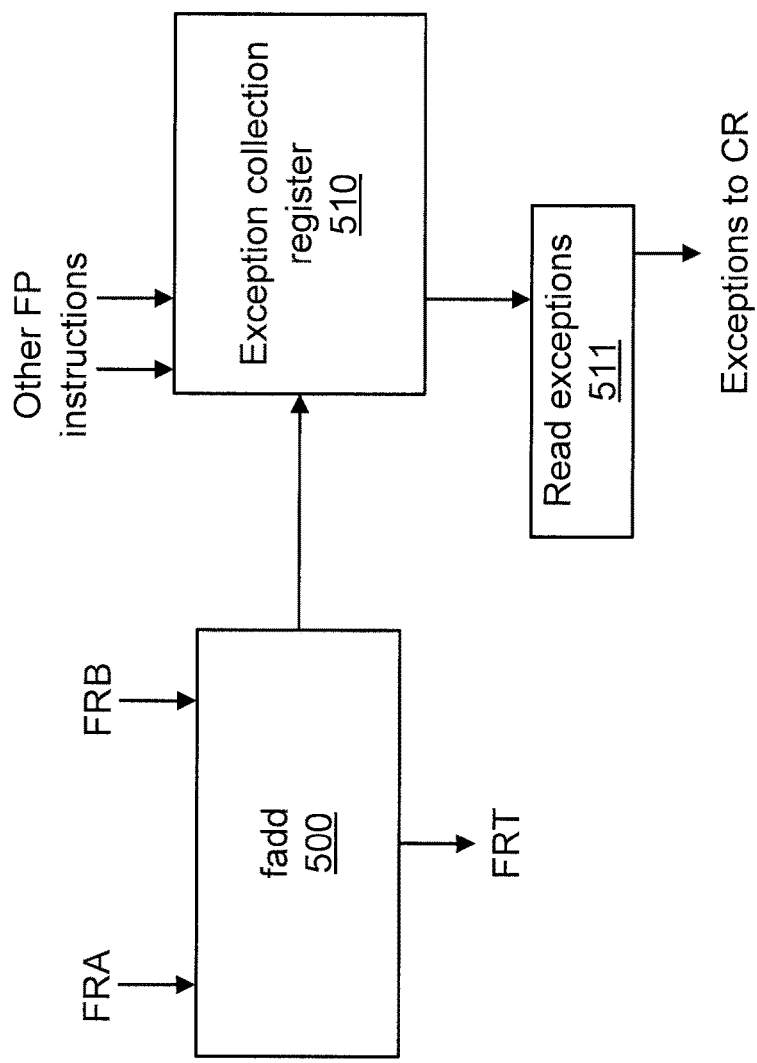
FIG. 5 graphically shows the method of FIG. 4, in accordance with an embodiment of the present invention.

FIG. 5 graphically shows the processing of exceptions relative to FIG. 3, in accordance with an embodiment of the present invention. In FIG. 5, the exception collection register 510 is accessed by a read exceptions internal instruction 511 which sends the exceptions to the CR.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for record form Floating-Point (FP) instruction execution, comprising:
    cracking, by a processor, a record form FP instruction into two internal instructions independent of a machine state, wherein a first one of the two internal instructions executes out-of-order to compute a target FP register and a second one of the two internal instructions executes in-order to compute a condition register (CR) to improve a processing speed of the record form FP instruction.

2. The computer-implemented method of claim 1, wherein the record form FP instruction is a floating point arithmetic instruction.

3. The computer-implemented method of claim 1, further comprising using an explicit read exception collection to process the record form FP instruction.

4. The computer-implemented method of claim 1, wherein respective executions of the first internal instruction and the second internal instruction reduce a critical code path of the record form FP instruction.

5. The computer-implemented method of claim 1, wherein respective executions of the first internal instruction and the second internal instruction reduce a critical code path of a computer program that includes the record form FP instruction.

6. The computer-implemented method of claim 1, wherein the processor is a multi-core processor configured to perform simultaneous multithreading.

7. The computer-implemented method of claim 1, wherein the processor is a multi-core superscalar symmetric processor.

* * * * *